US008355761B2

(12) United States Patent
Harada

(10) Patent No.: US 8,355,761 B2
(45) Date of Patent: Jan. 15, 2013

(54) FOLDING/SLIDING MOBILE TERMINAL WITH SEPARATE ANTENNAS IN TWO SEPARATE CASINGS

(75) Inventor: Takashi Harada, Tokyo (JP)

(73) Assignee: NEC Corporation, Tokyo (JP)

(*) Notice: Subject to any disclaimer, the term of this patent is extended or adjusted under 35 U.S.C. 154(b) by 291 days.

(21) Appl. No.: 12/744,397

(22) PCT Filed: Oct. 7, 2008

(86) PCT No.: PCT/JP2008/068227
§ 371 (c)(1),
(2), (4) Date: May 24, 2010

(87) PCT Pub. No.: WO2009/081638
PCT Pub. Date: Jul. 2, 2009

(65) Prior Publication Data

US 2010/0255892 A1 Oct. 7, 2010

(30) Foreign Application Priority Data

Dec. 20, 2007 (JP) ................................ 2007-329172

(51) Int. Cl.
*H04M 1/00* (2006.01)

(52) U.S. Cl. .................. 455/575.1; 455/575.2; 455/575; 455/575.4; 455/575.6; 455/575.7; 455/90.1; 455/90.2; 455/90.3

(58) Field of Classification Search .... 455/575.1–575.7, 455/90.1, 90.2, 90.3
See application file for complete search history.

(56) References Cited

U.S. PATENT DOCUMENTS

| | | | | |
|---|---|---|---|---|
| 7,162,283 | B2 * | 1/2007 | Bae et al. | 455/575.4 |
| 7,225,004 | B2 * | 5/2007 | Saito et al. | 455/575.7 |
| 7,289,072 | B2 * | 10/2007 | Sakurai | 343/702 |
| 8,014,842 | B2 * | 9/2011 | Kuga et al. | 455/575.4 |
| 8,155,719 | B2 * | 4/2012 | Park | 455/575.4 |
| 2005/0143151 | A1 * | 6/2005 | Ito et al. | 455/575.3 |
| 2005/0239519 | A1 * | 10/2005 | Saitou et al. | 455/575.1 |
| 2009/0131129 | A1 * | 5/2009 | Yamazaki et al. | 455/575.7 |

FOREIGN PATENT DOCUMENTS

| | | | |
|---|---|---|---|
| JP | 2004146865 | A | 5/2004 |
| JP | 2004363863 | A | 12/2004 |
| JP | 2005109971 | A | 4/2005 |
| JP | 2005184454 | A | 7/2005 |
| JP | 2006041899 | A | 2/2006 |
| JP | 2006054843 | A | 2/2006 |
| JP | 2006166265 | A | 6/2006 |
| JP | 2007104468 | A | 4/2007 |
| JP | 2007208335 | A | 8/2007 |

* cited by examiner

*Primary Examiner* — Kamran Afshar
*Assistant Examiner* — Sayed T Zewari

(57) ABSTRACT

A mobile terminal comprises at last a first casing (7) and a second casing (8). First casing (7) and second casing (8) are coupled together in a manner such that the combined configuration of the first and second casings can be varied. First casing (7) has at least a radio circuit (5) and a first antenna (1) connected to the radio circuit, and second casing (8) has at least a second antenna (3). First casing (7) has a feed element (2) connected to the radio circuit. When the combined configuration of the first and second casings is a predetermined configuration, feed element (2) of the first casing and the second antenna of second casing (8) are close to each other to be capacitively coupled together, so that second antenna is connected with radio circuit through feed element via high-frequency waves.

5 Claims, 6 Drawing Sheets

FOLDING/SLIDING MOBILE TERMINAL WITH SEPARATE ANTENNAS IN TWO SEPARATE CASINGS

This application is the National Phase of PCT/JP2008/068227, filed Oct. 7, 2008, which is based upon and claims the benefit of priority from Japanese patent application No. 2007-329172 filed on Dec. 20, 2007, the disclosure of which is incorporated herein in its entirety by reference.

TECHNICAL FIELD

The present invention relates to a mobile terminal and, more particularly to an antenna structure of a mobile terminal having casings each equipped with an antenna.

BACKGROUND ART

In recent years, mobile terminals, such as a mobile phone, have been widespread, and mobile phones have been on sale which have a plurality of casings, allowing the combined configuration of the casings of the mobile phone to be changed into a variety of configurations. This type of a mobile phone is typically equipped with one antenna. However, a plurality of antennas are required for a multi-band type mobile phone that utilizes a plurality of radio frequency bands. Further, since the reception sensibility of antennas of the mobile phone is caused to change due to the combined configuration of the casings of the mobile phone or due to the direction of the mobile phone when it is held, some mobile phones are equipped with a plurality of antennas in order to obtain a stable reception sensibility.

For example, JP2004-363863A discloses a mobile phone which is equipped with a plurality of antennas. A plurality of antennas are typically mounted in a mobile phone having a plurality of casings in the following manner. A radio circuit and a first antenna are installed in a first casing, a second antenna is installed in a second casing, and the radio circuit and the second antenna are connected to each other through wirings which are placed between the casings. In use, the first and second antennas are switched to each other by a switching means.

However, the above-described structure is problematic in that the arrangement of the second antenna is limited due to the requirement of connecting the radio circuit in the first casing and the second antenna in the second casing to each other with wirings, and for mobile terminals which are required to be downsized, in particular, the flexibility in arranging antennas is lowered.

Further, recent mobile terminals often undergo a complicated change of the combined configuration of the casings for product differentiation. When the structure of connecting the casings is complicated, wirings which connect the radio circuit and the second antenna together need to be routed within the casings. As a result, there arise problems in which antenna characteristics are deteriorated because the wirings become long, and are also changed because the arrangement of antennas varies depending on the combined configuration of the casings.

DISCLOSURE OF THE INVENTION

The present invention has been made in view of the above-described problems, and has for its main objective providing an antenna structure for a mobile terminal which is capable of increasing the flexibility in arranging antennas.

Another object of the present invention is to provide an antenna structure for a mobile terminal which is capable of improving antenna characteristics.

To achieve the above objects, a mobile terminal according to the present invention comprises at least a first casing and a second casing which are coupled together in a manner such that the combined configuration of said first and second casings can be varied, the first casing having at least a radio circuit and a first antenna connected to the radio circuit, and the second casing having at least a second antenna, and is characterized in that the first casing has a feed element connected to said radio circuit, and when the combined configuration of the first and second casings is a predetermined configuration, the feed element of the first casing and the second antenna in the second casing are close to each other to be capacitively coupled together, so that the second antenna is connected with the radio circuit via the feed element with high-frequency waves.

In the mobile terminal according to the present invention, the first casing may have a configuration detection section for detecting the combined configuration of the first and second casings, and a switching circuit for, based on a control signal from the configuration detection section, connecting the radio circuit either to the first antenna or to the feed element, and the switching circuit connects said radio circuit with the feed element when the combined configuration of the first and second casings is the predetermined configuration, and connects the radio circuit with the first antenna when the combined configuration of the first and second casings is a configuration other than the predetermined configuration.

The mobile terminal according to the present invention provides the following advantages:

The first advantage is that even when arranging the second antenna in the second casing which is different from the first casing in which the radio circuit and the first antenna are arranged, the flexibility in arranging antennas can be increased.

The reason is that since the radio circuit and the second antenna are not directly connected to each other by wirings, but are indirectly connected to each other by means of a capacitive coupling of the radio circuit with a feed element provided in the first casing, the second antenna can be arranged without the routing of the wirings.

The second advantage of the present invention is that antenna characteristics can be improved.

The reason is that antenna characteristics are not deteriorated due to wirings routed between the casings, and antenna characteristics are not changed even when the combined configuration of the casings varies intricately.

BEST MODE FOR CARRYING OUT THE INVENTION

Figure 1:
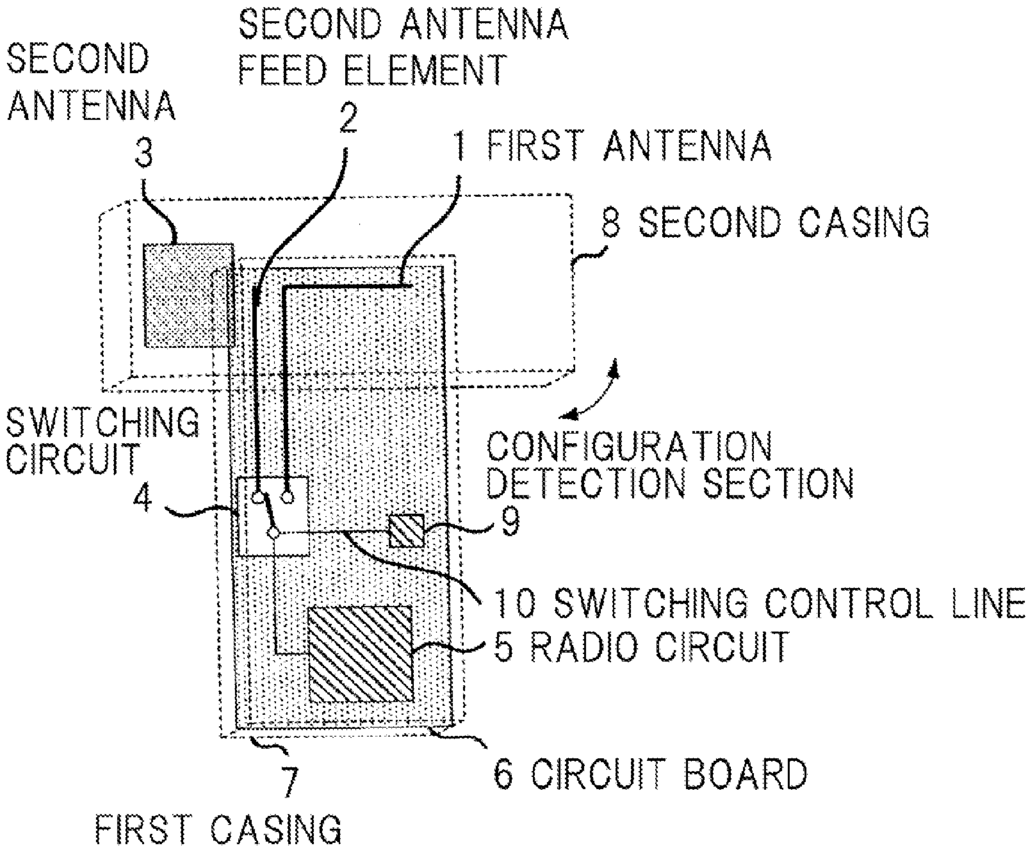
FIG. 1 is a perspective view schematically illustrating a configuration of the mobile phone according to an exemplary embodiment of the present invention.

As discussed in Background art, when arranging a plurality of antennas on a mobile terminal having a plurality of casings, a structure is typically employed wherein a radio circuit and a first antenna connected thereto are housed in a first casing, and a second antenna is housed in a second casing, the radio circuit being connected with the second antenna through wirings which are disposed between the casings. However, a demand to downsize a mobile terminal imposes limitations on the arrangement of antennas. Further, a mobile terminal in which a combined configuration of casings changes intricately, suffers from problems in which antenna characteristics are deteriorated by routing of wirings and also changed due to the fact that the placement of wirings is altered depending on the combined configuration of the casings.

These problems are ascribable to the fact that the radio circuit and the second antenna are connected to each other through wirings which are arranged between the casings. The present invention addresses the problems not by directly connecting the second antenna and the radio circuit to each other through wirings, but by providing feed elements connected with the radio circuit in the first casing, and coupling the feed elements and the second antenna with capacitance for connection via high frequency waves.

Specifically, for a mobile terminal having first and second casings, it is contemplated that a radio circuit, a first antenna, a second antenna feed element, a switching circuit and a section for detecting the shape of a casing are provided in the first casing, and a second antenna feed element and a second antenna are provided in the second casing such that when the first and second casings have a predetermined combined configuration, these come close to the first antenna feed element.

Since the mobile terminal according to the present invention is thus configured such that the second antenna is excited by the second antenna feed element, RF signals excited by second antenna are transmitted to the radio circuit via the second antenna feed element and switching circuit when the first and second casings have the predetermined combined configuration. As a result, the second antenna which is arranged in the second casing in which the radio circuit is not arranged, is not in direct contact with, but is coupled with the radio circuit with capacitance for connection via high-frequency waves.

This obviates the need for connecting the radio circuit and the second antenna to each other by wirings arranged between the casings. Thus, it is possible to arrange the second antenna even in a mobile terminal for which downsizing is being required, thus increasing the flexibility in arranging antennas. Furthermore, antenna characteristics are not deteriorated by routing of wirings between the casings and are not changed even when the placement of the wirings is altered due to the combined configuration of the casings. Antenna characteristics are thus improved.

In order to explain the present exemplary embodiment of the present invention in more detail, a mobile phone according the present exemplary embodiment will be explained below with reference to FIGS. 1 to 10. FIGS. 1 to 5 are perspective views schematically illustrating the configuration of the mobile phone according to the present exemplary embodiment, and FIGS. 6 to 10 are plan views schematically illustrating the configuration of a first antenna of the mobile phone according to the present exemplary embodiment.

As shown in FIG. 1, the mobile phone according to the present exemplary embodiment comprises first casing 7 and second casing 8 which are rotatably coupled together by means of a coupling structure (not shown). First casing 7 and second casing 8 can have a casing configuration together in which they are arranged in vertically long and horizontally long positions, respectively, i.e., the longitudinal direction of first casing 7 is generally orthogonal to the longitudinal direction of second casing 8.

First casing 7 includes therein circuit board 6 having at least first antenna 1, second antenna feed element 2, switching circuit 4, radio circuit 5, casing configuration detection section 9 and switching control line 10 which are formed on circuit board 6. Second casing 8 includes at least second antenna 3.

Switching circuit 4 has at least three terminals each connected with first antenna 1, second antenna feed element 2 and radio circuit 5, respectively. Switching circuit 4 receives a control signal transmitted from casing configuration detection section 9 over switching control line 10, and performs, based on the control signal, a switching operation to connect radio circuit 5 either to first antenna 1 or to second antenna feed element 2.

It is to be noted that FIG. 1 shows, of the configurations to be provided on the mobile phone, the configuration alone that is related to the operation of the present invention. Arbitrary means other than the above means which are necessary for the operation of the mobile phone may be provided. For example, a speaker for output of sound, a microphone for input of sound, a display section for displaying various items of information, such as LCD (Liquid Crystal Display), a key operation section for performing various operations, a memory for storing various items of information, and so forth may be provided.

In FIG. 1, first antenna 1 has an L-shaped configuration and second antenna 3 has a plate-like configuration. However, first antenna 1 and second antenna 3 need only to have the configuration for the reception/transmission of RF signals, and their frequency bands, configurations, structures, materials etc. are not particularly limited. Further, second antenna feed element 2 needs only to have a construction in which second antenna feed element 2 is arranged to at least partially overlap with second casing 8 and can be capacitively-coupled with second antenna 3. The configuration, structure, material etc. of second antenna feed element 2 are not particularly limited.

Radio circuit 5 demodulates RF signals received by first antenna 1 or second antenna 3 and output the demodulated signals from speaker not shown and display section. In addition, radio circuit 5 modulates signals which are input from the microphone not shown or key operation section, and output the modulated signals from first antenna 1 or second antenna 3.

Casing configuration detection section 9 needs only to have a structure which is capable of detecting the combined configuration of first casing and second casing 8. For example, casing configuration detection section 9 may be constituted by a sensor (a Hall IC etc.) which detects a magnetic force, or may be constituted by a sensor which detects an electric resistance, pressure, light and the like.

For example, casing configuration detection section 9 may be constituted by the combination of a Hall IC and a magnet. In this case, the hall IC is placed in first casing 7 and the magnet is placed in second casing 8 so that a case in which first casing 7 and second casing 8 overlap each other and a case in which first casing 7 and second casing 8 do not overlap each other may be detected. When first casing 7 and second casing 8 overlap each other, a control signal is transmitted to switching circuit 4 to cause the latter to operate in such a manner that first antenna 1 is connected to radio circuit 5 with high frequency waves. When first casing 7 and second casing 8 do not overlap each other, a control signal is transmitted to switching circuit 4 to cause the latter to operate in such a manner that second antenna 3 is connected to radio circuit 5 via high frequency waves.

Operation of the mobile phone having the above-described configuration will be described below.

As shown in FIG. 1, when the mobile phone takes the casing configuration wherein first casing 7 and second casing 8 are arranged vertically and horizontally, respectively, casing configuration detection section 9 transmits a first control signal to switching circuit 4 over switching control line 10, which in turn performs switching of contacts such that second antenna feed element 2 and radio circuit 5 are connected to each other. As a result, RF signals that are excited by second antenna 3 are transmitted to radio circuit 5 via second antenna feed element 2 and switching circuit 4 to be processed. Therefore, second antenna 3 which is configured within second casing 8 and radio circuit 5 are not in direct contact with each other, but are capacitively coupled to each other, that is, are coupled to each other via high-frequency waves, thus enabling a radio communication using second antenna 3.

Figure 2:
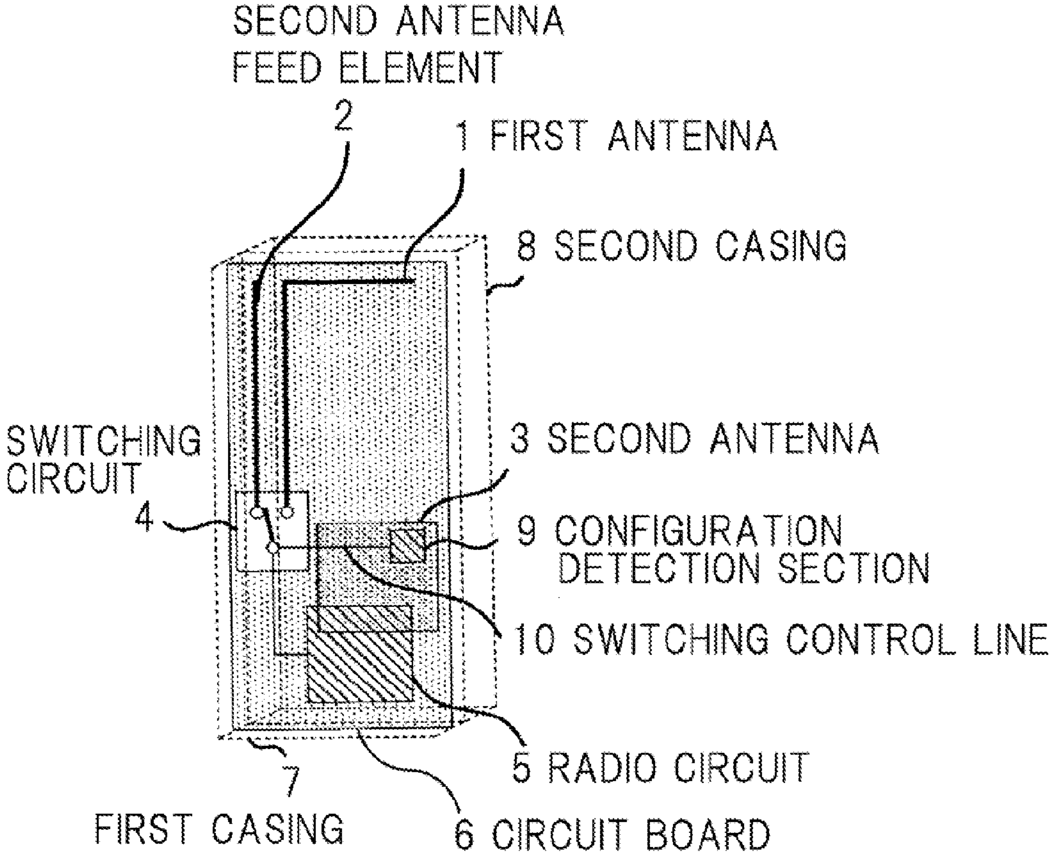
FIG. 2 is a perspective view schematically illustrating another configuration of the mobile phone according to an exemplary embodiment of the present invention.

As shown in FIG. 2, when the mobile phone takes the casing configuration wherein first casing 7 and second casing 8 overlap each other, second antenna 3 which is arranged within second casing 8 are not coupled to each other via high-frequency waves. As a result, casing configuration detection section 9 transmits a second control signal to switching circuit over switching control line 10, which in turn performs switching of contacts such that first antenna 1 and radio circuit 5 are connected to each other. Therefore, RF signals that are excited by first antenna 1 are transmitted to radio circuit 5 via switching circuit 4 and are processed by the radio circuit.

Thus, according to the present exemplary embodiment, radio circuit 5 and second antenna feed element 2 are arranged within first casing 7, and second antenna 3 is arranged within second casing 8. Therefore, second antenna 3 and radio circuit 5 can be coupled to each other via high-frequency waves without wirings arranged between the casings. This increases the flexibility of arranging the antennas and improves the antenna characteristics.

Furthermore, even when first antenna 1, casing configuration detection section 9 and switching circuit control line 10 are provided within first casing 7 and the combined configuration of casings is one that does not allow second antenna 3 to operate, as shown in FIG. 2, casing configuration detection section 9 detects that the mobile phone has a configuration different from that shown in FIG. 1, and controls switching circuit 4 which is connected with casing configuration detection section 9 via switching circuit control line 10 such that first antenna 1 and radio circuit 5 are coupled to each other via high-frequency waves so that radio circuit 5 processes RF signals excited in first antenna 1. Therefore, a stable radio communication is ensured.

In the foregoing explanation, the exemplary embodiment has been described by taking as an example a rotary-type mobile phone wherein its configuration can be changed from a state wherein first casing 7 and second casing 8 overlap each other to a state wherein first casing 7 and second casing 8 are orthogonal to each other. However, the present invention is applicable to mobile phones having diverse constructions because the antenna structure of the present invention eliminates the need of directly connecting between second antenna 3 and radio circuit 5 using wirings.

Figure 3:
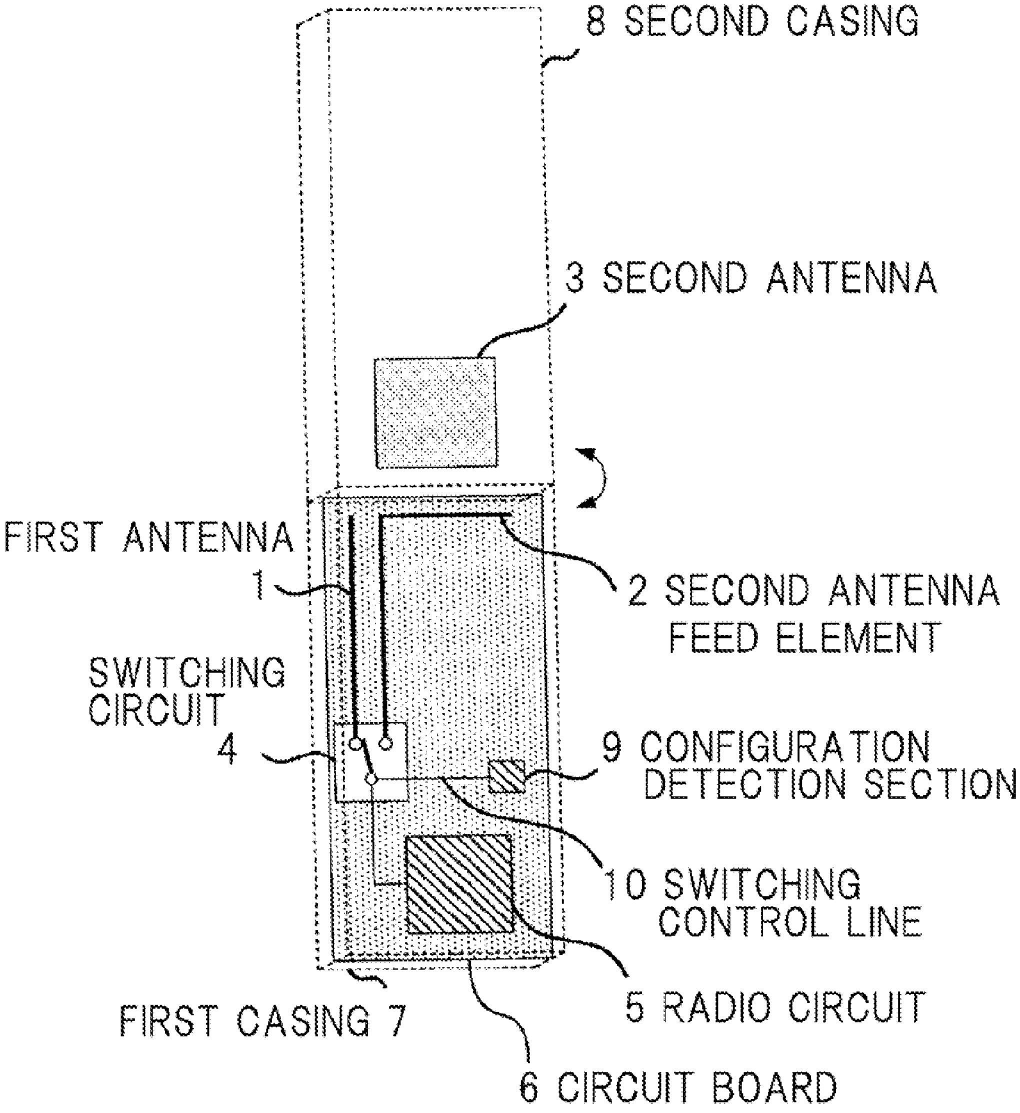
FIG. 3 is a perspective view schematically illustrating another configuration of the mobile phone according to an exemplary embodiment of the present invention.

FIG. 3 illustrates a state of a foldable mobile phone in which first casing 7 and second casing 8 are developed to each other by means of a hinge structure from the overlapped state of first casing 7 and second casing 8. In such a mobile phone, when the two casings are developed, second antenna feed element 2 and second antenna 3 are arranged such that they are close to each other, and switching circuit 4 connects, controlled by casing configuration detection section 9, second antenna feed element 2 and radio circuit 5 to each other. When the two casings overlap each other, switching circuit 4 connects, controlled by casing configuration detection section 9, first antenna 1 and radio circuit 5 to each other. Therefore, a foldable mobile phone as shown in FIG. 3 also provides the advantages similar to those in the mobile phone as shown in FIGS. 1 and 2.

Figure 4:
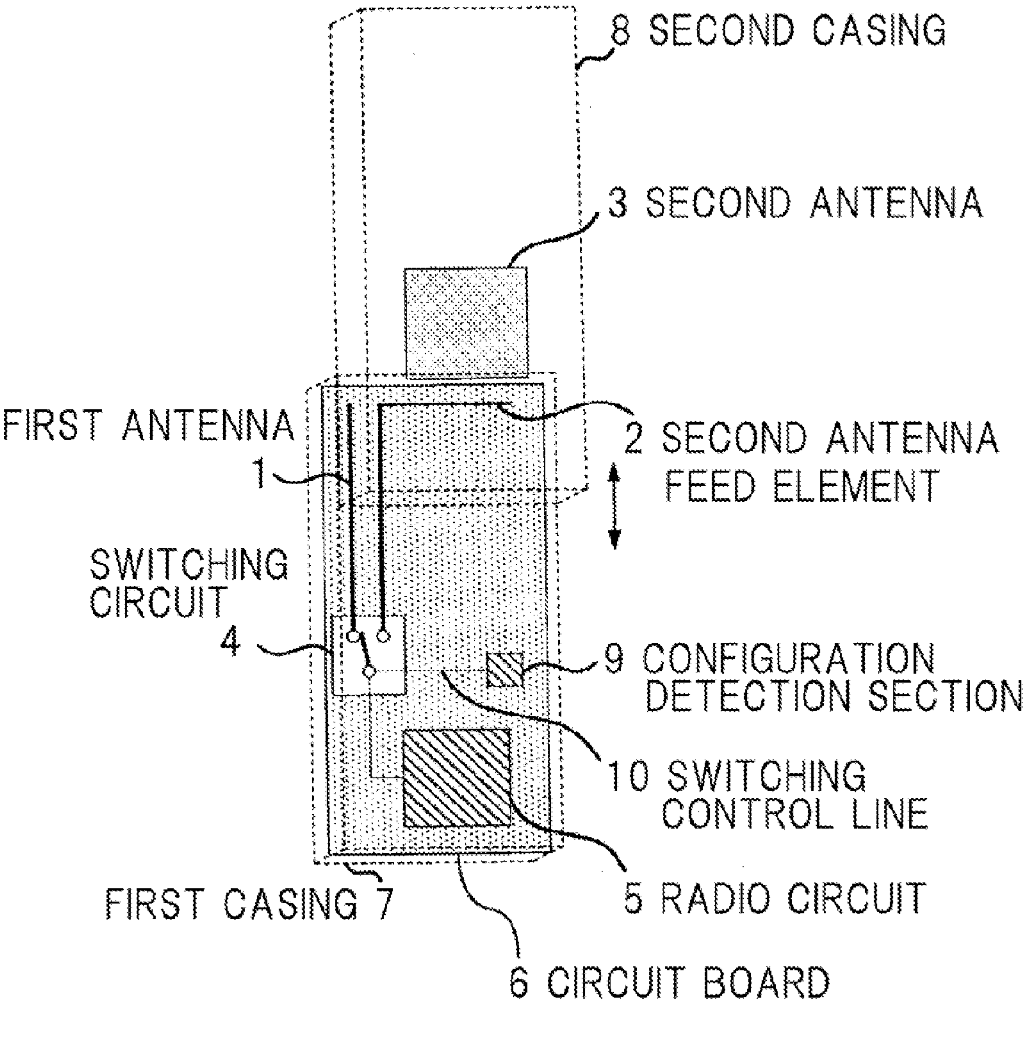
FIG. 4 is a perspective view schematically illustrating another configuration of the mobile phone according to an exemplary embodiment of the present invention.

FIG. 4 illustrates the state of a slidable mobile phone in which second casing 8 is slid relative to first casing 7 from the overlapped state of first casing 7 and second casing 8. In such a mobile phone, when second casing 8 is slid relative to first casing 7, second antenna feed element 2 and second antenna 3 are arranged such that they are close to each other, and switching circuit 4 connects, controlled by casing configuration detection section 9, second antenna feed element 2 and radio circuit 5 to each other. When the two casings are overlap each other, switching circuit 4 connects, controlled by casing configuration detection section 9, first antenna 1 and radio circuit 5 to each other. Therefore, a slidable mobile phone as shown in FIG. 4 also provides the advantages similar to those in the mobile phone as shown in FIGS. 1 and 2.

Figure 5:
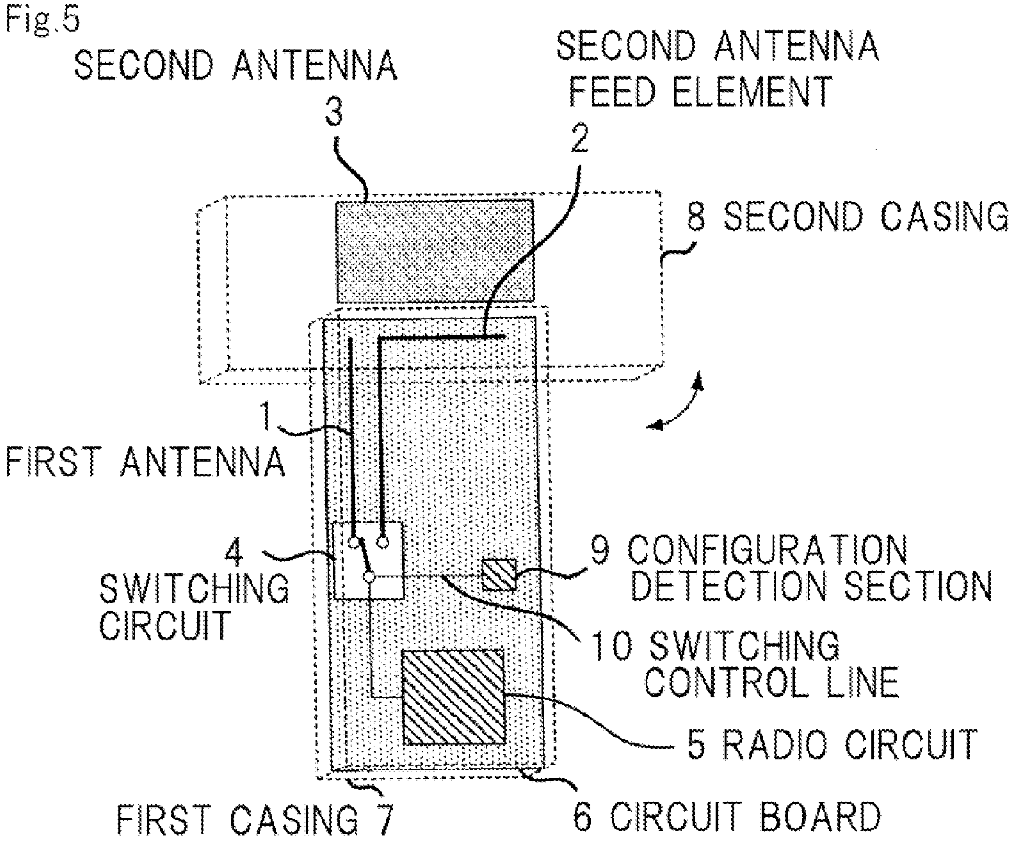
FIG. 5 is a perspective view schematically illustrating another configuration of the mobile phone according to an exemplary embodiment of the present invention.

FIG. 5 illustrates the state in which second casing 8 shown in FIG. 1 is slid upwards. A mobile phone having such a construction also provides advantages similar to those in the mobile phone as shown in FIGS. 1 and 2, by arranging second antenna feed element 2 and second antenna 3 such that they are close to each other, when first casing 7 and second casing 8 are arranged vertically and horizontally, respectively.

For mobile phones basically having a casing configuration as shown in FIG. 2 and accompanied by a change in the configuration of casings as shown in FIGS. 1, 3, 4 and 5, second antenna 3 can be operated even when first antenna 1 is not expected to have good characteristics, by operating either first antenna 1 or second antenna 3 by the control of switching circuit 4, thus providing antenna characteristics which are stable at all times.

Figure 6:
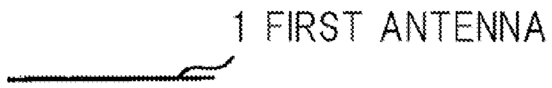
FIG. 6 is a plan view schematically illustrating a construction of antennas of the mobile phone according to an exemplary embodiment of the present invention.
Figure 7:
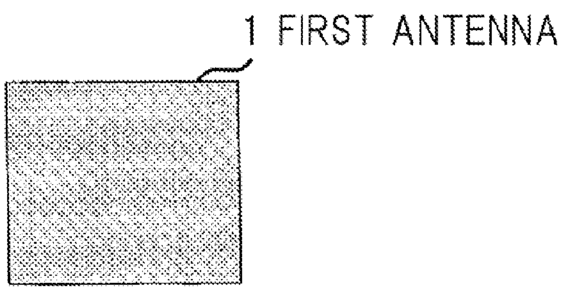
FIG. 7 is a plan view schematically illustrating another construction of antennas of the mobile phone according to an exemplary embodiment of the present invention.
Figure 8:
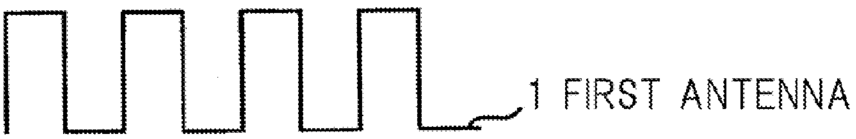
FIG. 8 is a plan view schematically illustrating another construction of antennas of the mobile phone according to an exemplary embodiment of the present invention.
Figure 9:
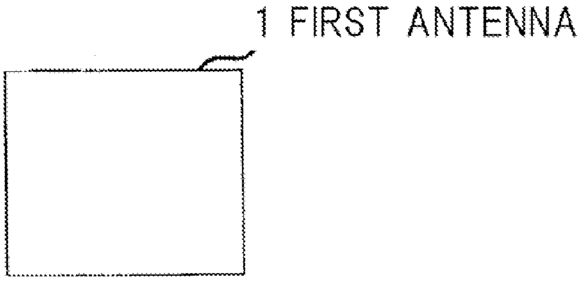
FIG. 9 is a plan view schematically illustrating another construction of antennas of the mobile phone according to an exemplary embodiment of the present invention.
Figure 10:
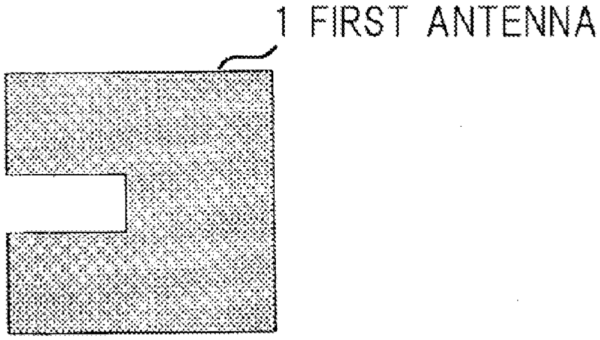
FIG. 10 is a plan view schematically illustrating another construction of antennas of the mobile phone according to an exemplary embodiment of the present invention.

In FIGS. 1 to 5, first antenna 1 has a linear configuration shown in FIG. 6 or an L-shaped configuration. However, first antenna 1 may have other configurations. For example, as shown in FIG. 7, first antenna 1 may have a plate-like configuration similar to that of second antenna 3 as shown in FIG. 1. Further, first antenna 1 may have a meandering configuration (zigzag configuration), as shown in FIG. 8. Furthermore, first antenna 1 may have a looped configuration, as shown in FIG. 9. Moreover, first antenna 1 may have a plate-like configuration with a cut, as shown in FIG. 10.

Although FIGS. 6 to 10 illustrate variants of the configuration of first antenna 1, similar changes may be made to second antenna 3 and second antenna feed element 2. Further, an arbitrary antenna configuration may be selected for first antenna 1, second antenna 3 and second antenna feed element 2 and may be combined.

In the foregoing explanation, the exemplary embodiments have been described by taking as an example a mobile phone having two casings: first casing 7 and second casing 8. However, the present invention is not limited to the above exemplary embodiments, and is also applicable to a mobile phone having three or more casings in a similar manner.

Further, in the above-described exemplary embodiments, an explanation is given in a case where the antenna structure according to the present invention is applied to a mobile phone. However, the antenna structure according to the present invention may also be applied to any radio communication terminal having casings that are each equipped with an antenna.

The present invention is not limited to a mobile phone, but can be applied to any mobile terminals having a structure with varying combined configurations of casings, such as, for example, a PDA (Personal Digital Assistance), a notebook computer, a game console and so forth.

While the present invention has been described with reference to exemplary embodiments, the present invention is not limited thereto, and changes and variations that anyone skilled in the art can understand may be made without departing from the spirit or scope of the following claims.

The invention claimed is:

1. A mobile terminal comprising:

at least a first casing and a second casing which are coupled together in a manner in which a combined configuration of said first and second casings can be varied, said first casing having at least a radio circuit and a first antenna connected to said radio circuit, and said second casing having at least a second antenna, wherein said first casing has a feed element connected to said radio circuit, wherein when the combined configuration of said first and second casings is a predetermined configuration, said feed element of said first casing and said second antenna of said second casing are close to each other and are capacitively coupled together, so that said second antenna is connected with said radio circuit through said feed element via high-frequency waves, wherein said first casing has a configuration detection section for detecting the combined configuration of said first and second casings, and a switching circuit for, based on a control signal from said configuration detection section, connecting said radio circuit either to said first antenna or to said feed element, and wherein said switching circuit connects said radio circuit with said feed element when the combined configuration of said first and second casings is the predetermined configuration, and connects said radio circuit with said first antenna when the combined configuration of said first and second casings is a configuration other than the predetermined configuration.

2. The mobile terminal according to claim 1, wherein the combined configuration of said first and second casings includes a first combined configuration wherein said first and second casings overlap each other, and a second combined configuration wherein said first and second casings are positioned such that they are generally orthogonal to each other.

3. The mobile terminal according to claim 1, wherein the combined configuration of said first and second casings includes a first combined configuration wherein said first and second casings overlap each other, and a second combined configuration wherein said first and second casings are developed by means of a hinge structure.

4. The mobile terminal according to claim 1, wherein the combined configuration of said first and second casings includes a first combined configuration wherein said first and second casings overlap each other, and a second combined configuration wherein either said first or second casing slides relative to the other casing.

5. The mobile terminal according to claim 1, wherein said feed element of said first casing and said second antenna of said second casing are capacitively coupled together without a wire.

* * * * *